United States Patent [19]

Welsh

[11] Patent Number: 5,250,577
[45] Date of Patent: Oct. 5, 1993

[54] POLYSTYRENE FOAM MADE WITH ONLY CARBON DIOXIDE AS A BLOWING AGENT AND A PROCESS FOR MAKING THE SAME

[75] Inventor: Gary C. Welsh, Midland, Mich.

[73] Assignee: The Dow Chemical Company, Midland, Mich.

[21] Appl. No.: 388,468

[22] Filed: Aug. 2, 1989

[51] Int. Cl.$^5$ .................................................. C08J 9/08
[52] U.S. Cl. ........................................ 521/79; 264/51; 264/53; 521/81; 521/82; 521/97; 521/146
[58] Field of Search ............... 521/82, 79, 81, 146, 521/97; 264/51, 53

[56] References Cited

U.S. PATENT DOCUMENTS

| | | | |
|---|---|---|---|
| 2,928,130 | 3/1960 | Gray | 521/79 |
| 3,406,230 | 10/1968 | Baxter et al. | 521/79 |
| 3,431,164 | 3/1969 | Gilbert | 264/53 |
| 3,960,792 | 6/1976 | Nakamura | 521/146 |
| 4,198,363 | 4/1980 | Noel | 264/45.9 |
| 4,298,702 | 11/1981 | Hahn et al. | 521/79 |
| 4,306,036 | 12/1981 | Corbett | 521/147 |
| 4,312,910 | 1/1982 | Suh et al. | 521/79 |
| 4,344,710 | 8/1982 | Johnson et al. | 264/53 |
| 4,446,253 | 5/1984 | Hahn et al. | 521/79 |
| 4,469,651 | 9/1984 | Hahn et al. | 521/95 |
| 4,470,938 | 9/1984 | Johnson | 264/50 |
| 4,473,665 | 9/1984 | Martini-Vvedensky et al. | 264/50 |

*Primary Examiner*—Morton Foelak

[57] ABSTRACT

The present invention is a styrenic polymer foam blown with solely carbon dioxide and a process for making that styrenic polymer foam. Foam sheet made by this process is especially useful for thermoforming purposes.

8 Claims, 3 Drawing Sheets

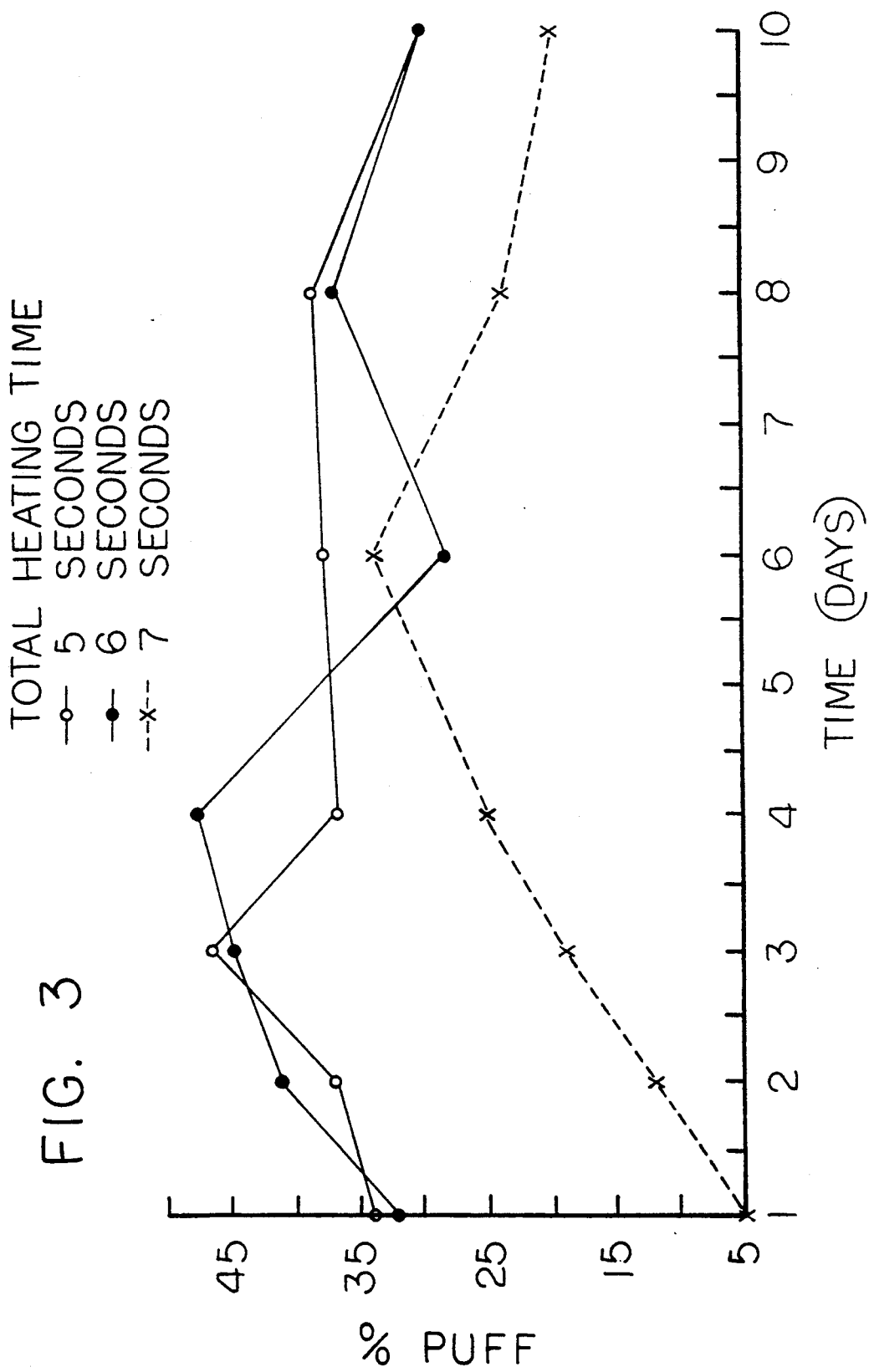

POLYSTYRENE FOAM MADE WITH ONLY CARBON DIOXIDE AS A BLOWING AGENT AND A PROCESS FOR MAKING THE SAME

BACKGROUND OF THE INVENTION

1. Field of the Invention

This invention relates to polystyrene foam prepared with a blowing agent which is only carbon dioxide. The invention also includes a process for making this polystyrene foam utilizing only carbon dioxide as the blowing agent. This invention is particularly suited for making polystyrene foam sheet having a thickness of less than about 0.5 inch.

2. History of the Art

Polystyrene foam, particularly in sheet form, is at the present time made from any number of blowing agents which may possess or cause one or more of the following undesirable characteristics: volatility, flammability, poor thermoforming characteristics, brittle foam sheet physical properties, high cost or an adverse effect to the ozone layer. Examples of these blowing agents would include aliphatic hydrocarbons and fully or partially halogenated hydrocarbons.

Some have experimented with blends of carbon dioxide and other blowing agents such as aliphatic hydrocarbons or fully or partially halogenated hydrocarbons. An example of this can be seen in U.S. Pat. Nos. 4,344,710 and 4,424,287. These patents, however, state that the use of a 100 percent carbon dioxide blowing agent has not been sucessfully employed in continuous direct injection foam sheet manufacturing (Column 1, lines 42–45 and lines 49–55 respectively) due to the extreme volatility. Use of these materials is said to produce corrugation and surface defects.

Others have developed methods and apparatuses for metering a gaseous blowing agent, such as an atmospheric gas, into a molten resin charge, such as polystyrene, in an accurate and precise manner. One example of this can be seen in U.S. Pat. No. 4,470,938. The apparatus of this patent meters discrete uniform volumetric charges of gaseous blowing agent into the molten resin using a free piston-cylinder combination which is given motive power by the supply gas source.

A typical current commercial polystyrene foam sheet extrusion process may use a tandem extrusion process (two extruders in series). The first extruder melts the polymer to produce a polymer melt. A high pressure metering pump would then deliver blowing agent to the polymer melt at the end of the first extruder where mixing is initiated prior to entering the second extruder where further mixing and cooling of the blowing agent and the polymer melt occurs. After exiting the second extruder the polymer melt then passes through and becomes a foam structure at an annular die. The foam structure, in the shape of an annular tube, is then stretched over a forming mandrel. The annular tube coming off the mandrel is then slit and opened to form a sheet which is then gathered on one or more rolls. The sheet is then aged and then thermoformed into a foam sheet packaging article.

The use of carbon dioxide as the sole blowing agent avoids many of the problems of other blowing agents and blends of other blowing agent with carbon dioxide. The use of carbon dioxide in liquid form avoids the problems of handling a gas.

Thus the invention is polystyrene foam blown solely with carbon dioxide, preferably liquid carbon dioxide, and the process necessary to make such polystyrene foam.

The invention is particularly suited for making polystyrene foam sheet having beneficial physical properties for thermoforming purposes.

SUMMARY OF THE INVENTION

The present invention is a thermoplastic foam made from a styrenic polymer and carbon dioxide as a blowing agent with the thermoplastic foam having tensile elongation values greater than or equal to about five percent over an extended period of time under ambient conditions in both a machine and a cross direction.

The present invention is also a foamable mixture of a molten styrenic polymer and carbon dioxide as a blowing agent.

Additionally the present invention is a process for producing a thermoplastic foam (and the foamable mixture) by melting a styrenic polymer, then continuously directly introducing into the melted styrenic polymer a blowing agent consisting essentially of carbon dioxide, then mixing intimately the styrenic polymer and the carbon dioxide and then extruding and foaming the mixture at a die temperature below about 150° C. into a region of lower pressure to form thermoplastic foam.

Finally the present invention also includes thermoplastic foam made by the process of the present invention.

The thermoplastic foam and process of the present invention are especially suited to make thermoplastic foam sheet for thermoforming purposes.

BRIEF DESCRIPTION OF THE DRAWINGS

FIG. 3 is a post expansion study of foam sheet at three different residence times in an oven.

DETAILED DESCRIPTION OF THE INVENTION

Figure 1:
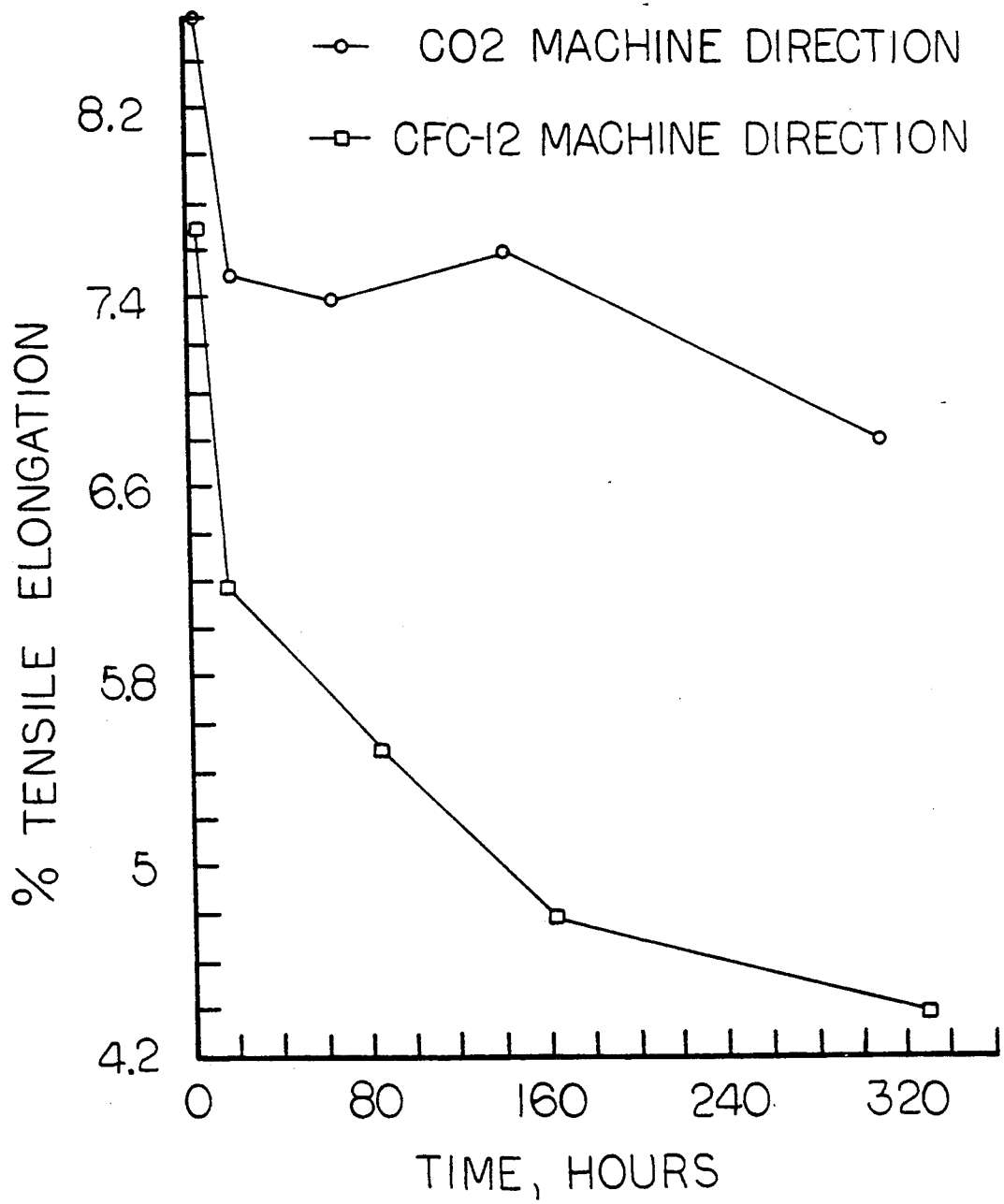
FIGS. 1 and 2 are machine direction and cross direction tensile elongation values, respectively, for foams prepared with carbon dioxide($CO_2$) and dichlorodifluoromethane (CFC-12) as blowing agents.

Polymers useful in the present invention are those polymers, copolymers and interpolymers having at least 70 percent by weight styrene monomer incorporated into the final resin as the monomeric repeat units. This includes other polymers such as for example styrene acrylonitrile, styrene acrylic acid, other known equivalents and blends having the styrene monomer repeat unit requirement. For the purpose of this invention these useful polymers shall be referred to as styrenic polymers. The preferred materials are styrenic homopolymers.

The blowing agent to be used would be that carbon dioxide which is normally commercially available. For the purposes of this specification such carbon dioxide shall be defined as 100 percent carbon dioxide even though this carbon dioxide may contain minor impurities or amounts of other compounds.

The carbon dioxide is preferably added to a polymer melt in a liquid form, although use of the carbon dioxide in the gaseous form would also be acceptable in the practice of the present invention.

The use of a tandem extrusion process for the manufacture of polystyrene foam sheet is typical, but is not required. Such a process includes a primary extruder, a blowing agent addition system into the primary extruder, a secondary extruder, an annular die, a cooling mandrel, a sheet cutter or slitter and a sheet gathering device, such as for example rollers and winders.

However, the use of this exact equipment set-up is not required in the process of this invention.

Additives, such as pigments, nucleating agents and other additives conventionally known in the art may be added to the polystyrene foam of the present invention. The addition of a nucleating agent is generally preferred and is added in an amount of from about 0.02 to about 10 percent of the total polystyrene by weight. Preferably the amount of nucleating agent is between about 0.2 to about 2 percent. One conventional nucleating agent is talc.

Polystyrene foam sheet can be produced using 100 percent carbon dioxide as the blowing agent provided certain modifications are made in the handling and the preparation of the polystyrene foam sheet. Preferably the carbon dioxide is continuously directly introduced or injected into the molten resin. Preferably the carbon dioxide is continuously directly injected as a high pressure liquid.

To produce foam sheet having a density in the range of about 2 to about 10 pounds per cubic foot (PCF), preferably about 3 to about 6 PCF, about 0.5 to about 6 weight percent, preferably about 1 to about 4 weight percent of carbon dioxide is required per weight of polymer. Cell sizes in all directions are less than 1 millimeter(mm), and preferably less than about 0.5 mm. The thickness of the foam sheet is preferably less than about 0.5 inch and more preferably less than about 0.25 inch.

It is possible to have a blow up ratio, that is a stretching of the foam over a mandrel after it exits a die, greater than 4:1. It is preferable to have a blow up ratio of at least 2.0:1.

The foaming temperature at the die is below 150° C. and preferably between 130° and 145° C. The thermoplastic foam is extruded and foamed into a zone of lower pressure preferably air at atmospheric pressure.

While it may be possible to use a polystyrene foam sheet immediately it is preferred to age the polystyrene foam sheet for a period of time, usually at least about 20 hours prior to thermoforming the foam sheet. This will allow time for air to counter diffuse into the cells. It will also render the tensile elongation values substantially constant. This will provide uniform thermoforming characteristics for the polystyrene foam sheet to be thermoformed.

Substantially constant tensile elongation values over an extended period of time obtained with a minimum of aging of the foam sheet would yield more consistent results upon thermoforming the foam sheet, thus more consistent product with less scrap. The tensile elongation values would preferably be in excess of five percent and would remain above five percent for an extended period of time, thus allowing the storage of foam sheet for an extended period of time before thermoforming without worrying about the changing values or the degradation below five percent of the tensile elongation values of the foam sheet.

The tensile elongation values are determined according to the method ASTM D638 "Tensile Properties of Plastics" published by the American Society for Testing and Materials (ASTM). The words machine or extrusion direction, transverse or cross direction and vertical direction are used in their normal and conventional manners.

Though the tensile elongation values of the foam sheet of the present invention are not perfectly constant, they are substantially constant and even more important for thermoforming, the tensile elongation values remain above a value of five percent for an extended period of time. Generally when these values fall below five percent the foam sheet becomes too brittle for thermoforming.

The thermoforming temperature will be somewhat higher than that of a polystyrene foam sheet blown with fully or partially halogenated chlorofluorocarbon or hydrocarbons since the $CO_2$ provides essentially no solvent effect which would normally lower the heat distortion temperature and therefore the melt strength of the foam walls upon reheating. The polystyrene foam sheet blown with 100 percent $CO_2$ can be post expanded in a range of about 20 to about 50 percent during thermoforming. It is preferred that the polystyrene foam sheet be aged for at least 20 hours prior to the carefully controlled thermoforming of the foam sheet.

Example and Comparative Example

Polystyrene foam sheet is prepared on a tandem extrusion line, with the polystyrene resin having a weight average molecular weight of about 300,000 being melted in the first extruder and with the carbon dioxide being continuously directly injected as a high pressure liquid into the end of the first extruder as a liquid. The pump heads providing the carbon dioxide to the extruder are cooled to about 0° F. with liquid nitrogen to eliminate vapor lock and to improve pump efficiency. The carbon dioxide is metered using a mass flow meter on a low pressure side or suction side of the pump. Confirmation of the percent Of $CO_2$ used is also made by measuring the weight loss of the $CO_2$ from storage cylinders holding the $CO_2$.

The results of this example and a comparative example, conventionally blown with dichlorodifluoromethane (CFC-12), are shown in Table I. Weights are percent weight by polymer weight. The thermoforming was performed in a manner typical for forming meat trays.

TABLE 1

| Foam Sheet and Extrusion Process Parameters 100% $CO_2$ Versus CFC-12 | | |
|---|---|---|
| | Comparative Example CFC-12 | Example 100% $CO_2$ |
| % Blowing Agent by weight | 5.0 | 2.5 |
| % Talc by weight | 0.7 | 0.5 |
| Sheet Gauge, mils | 120 | 130 |
| Sheet Density, PCF | 3.5 | 3.2 |
| Die Melt Temperature, °C. | 150 | 144 |
| Output Rate, lbs/hr | 198 | 169 |
| Blow Up Ratio | 3.5:1 | 3.5:1 |
| Extruder Pressure, psi | 3800 | 4700 |
| Die Pressure psi | 2000 | 3500 |
| Sheet Aging Time, days | 7 | 3 |
| Thermoformer % Post Expansion | 54 | 30 |
| Tooling Used | meat tray | meat tray |

As can be seen from Table 1 it is possible to use a lower amount of carbon dioxide to produce a foam sheet having approximately the same thickness and same density as a foam polystyrene foam sheet blown with the fully halogenated chlorofluorocarbon CFC-12. In addition the foam sheet produced from the 100 percent $CO_2$ blowing agent under these conditions has a smooth, uniform surface similar to that of foam sheet manufactured with aliphatic hydrocarbons and fully or partially halogenated hydrocarbons.

A typical set of cell sizes for 100 percent $CO_2$ blown foam sheet in the machine direction is 0.39 mm; cross direction is 0.33 mm; vertical direction is 0.28 mm. For the CFC-12 blown foam sheet, typical cell sizes are in the machine direction 0.28 mm; in the cross direction 0.33 mm; in the vertical direction 0.22 mm.

Figure 2:
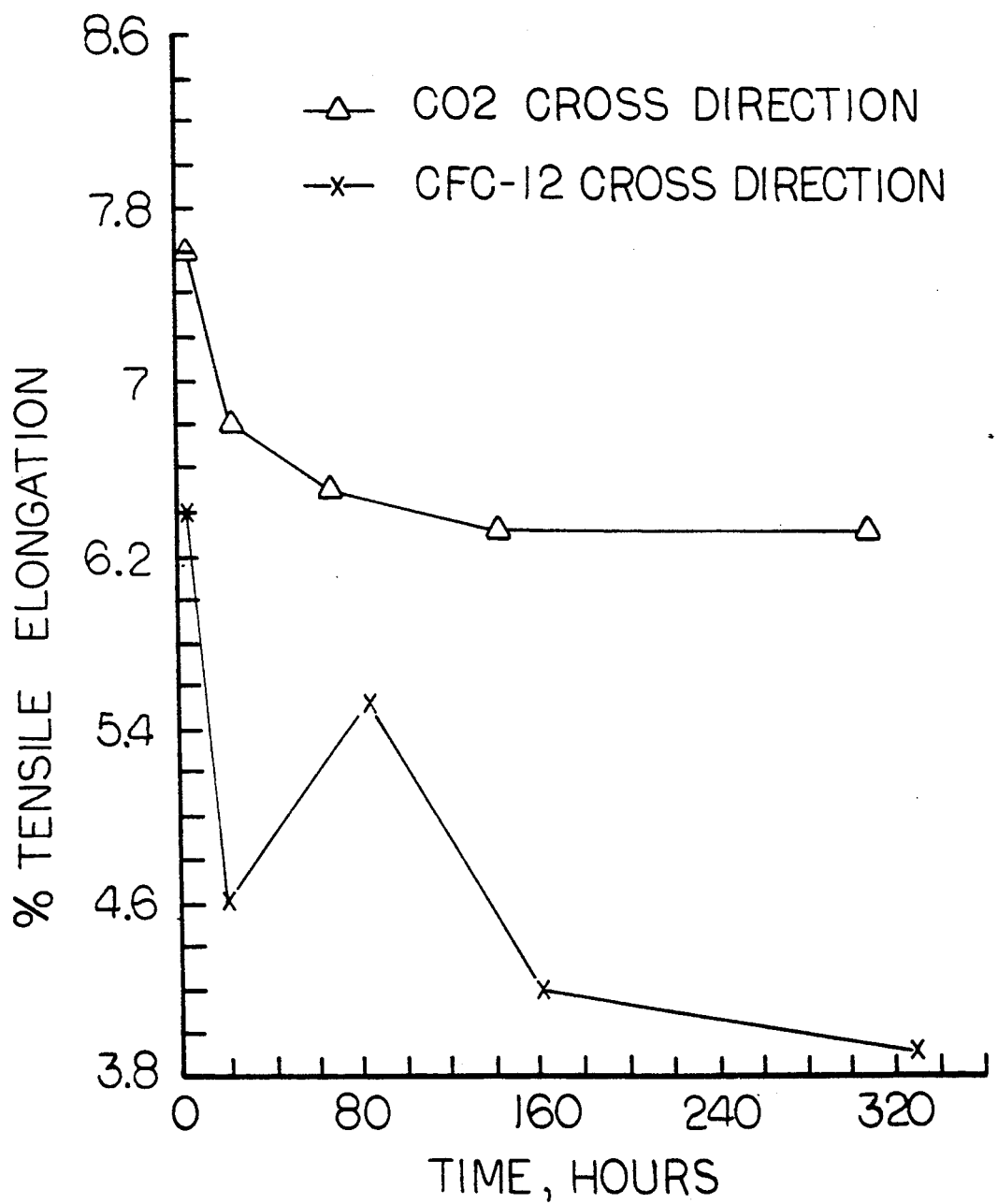

FIGS. 1 and 2, with a different example and comparative example (density of 5.1 PCF for the $CO_2$ blown foam sheet and 5.4 PCF for the CFC-12 blown sheet), also show an unexpected benefit when foam sheet is produced using only carbon dioxide as the blowing agent. The benefit is that the percent elongation in both the machine (FIG. 1) and transverse (FIG. 2) directions remains essentially constant, or at worst, decreases only slightly over time after a short initial aging period.

As FIGS. 1 and 2 show the tensile elongation values remain substantially constant for the $CO_2$ blown foam sheet, with only a 9.3 percent change in the machine direction from the period of time of 24 hours to 313 hours and only a 7.4 percent change in the cross direction during the same period.

In contrast, when using CFC-12 as the blowing agent, the percent elongation decreased drastically and substantially over the same time period after the same short initial aging period. FIGS. 1 and 2 show that the CFC-12 blown foam changed 29.0 percent in the machine direction and 15.2 percent in the cross direction for the period of time of 18.5 hours to 330 hours.

Also in FIGS. 1 and 2 the percent elongation in both directions is above five percent for an extended period of time only when carbon dioxide is used as the blowing agent.

The $CO_2$ blown foam sheet exhibits a machine direction tensile elongation of 6.8 percent and a cross direction tensile elongation of 6.3 percent after 313 hours of aging. The CFC-12 blown foam has a machine direction tensile elongation of 4.4 percent and a cross direction tensile elongation of 3.0 percent after 330 hours of aging.

Tensile elongation values below five percent are generally considered to be brittle and not acceptable for thermoforming purposes.

Tensile elongation values for the foam sheet which change at a rapid rate over an extended time make a determination as to when to thermoform the foam sheet difficult, and in addition, the foam sheet becomes brittle and difficult or impossible to thermoform when the tensile elongation values are less than five percent.

The product of the present invention has elongation values which remain constant, or at worse, decline only slightly over a long period of time. This means, as shown in FIGS. 1 and 2, that foam sheet stored on a roll and waiting to be thermoformed will have approximately the same elongation values at the thirty hour mark as at the one hundred sixty hour mark. This is not true for foam sheet produced with dichlorodifluoromethane and other types of aliphatic hydrocarbon and fully or partially halogenated hydrocarbon blowing agents.

Corrugation

It is also possible with the present invention to make 3-6 PCF foam sheet blown with $CO_2$ having little or no corrugation.

For the purpose of definition "little or no corrugation or noncorrugated" means that the thickness values for peaks and valleys are averaged, the overall average is determined by averaging the peak and valley averages and the difference between the overall average and the peak and valley average is less than about fifteen (15) percent.

In Table 2 Sheets 1, 2 and 3 have a blow-up ratio of 3.5:1. The weight percent $CO_2$ is 2.3 for Sheet 1; 2.0 for Sheet 2; and 1.3 for Sheet 3. The die temperature is 146° C. (centigrade) for Sheet 1; 141° C. for Sheet 2; and 144° C. for Sheet 3.

TABLE 2

| Sheet 1 3.77 PCF | | Sheet 2 3.60 PCF | | Sheet 3 5.75 PCF | |
|---|---|---|---|---|---|
| Peak | Valley | Peak | Valley | Peak | Valley |
| 141 | 94 | 105 | 84 | 87 | 81 |
| 154 | 101 | 105 | 88 | 88 | 85 |
| 171 | 108 | 108 | 89 | 92 | 99 |
| 127 | 89 | 103 | 90 | 87 | 95 |
|  |  |  |  | 85 | 86 |
| AVG. 148 | AVG. 98 | AVG. 105 | AVG. 88 | AVG. 88 | AVG. 89 |
| Average of Peak & valley | 123 |  | 96.5 |  | 88.5 |
| Difference Based on AVG | 20 percent |  | 8.8 percent |  | 0.6 percent |

As can be Table 2, with the values in mils (0.001 inch), the corrugation of Sheet 1 is 20 percent. This corrugation is visibly noticeable and this level of corrugation makes this sheet unsuitable for many thermoforming operations. Sheets 2 and 3 are acceptable. As can be seen the corrugation is 8.8 and 0.6 percent respectively, well below the 15 percent level. The difference between Sheet 1 and Sheets 2 and 3 is visibly noticeable and measurements confirmed the visual evidence.

As is clear in these examples, corrugation can be minimized or even prevented by controlling the die temperature and amount of blowing agent when using 100 percent carbon dioxide as a blowing agent.

Post Expansion (Thermoforming)

Polystyrene foam sheet 5.0 PCF and 100 mils thick, blown with carbon dioxide, is thermoformed into egg cartons in a thermoformer. Prior to being thermoformed the foam sheet is heated in an oven for 5, 6 or 7 seconds as detailed in FIG. 3. The oven temperatures are about 500° F. (Fahrenheit) in the bottom of the oven and about 600° F. in the top of the oven.

FIG. 3 shows that although the percent of puff or post expansion is sensitive to the amount of time in the oven, generally the amount of puff can be as much as about 20 to about 50 percent.

The present invention has been described with preferred embodiments. It is to be understood however that modifications and variations may be resorted to, without departing from the spirit and scope of the invention, as those skilled in the art will readily understand. These modifications and variations are considered to be within the scope and purview of the appended claims.

What is claimed is:

1. A process for producing a thermoplastic foam comprising the following steps:
   (a) melting a styrenic polymer;
   (b) continuously directly introducing into the melted styrenic polymer a blowing agent consisting essentially of carbon dioxide in an amount of about 0.5 to about 6 weight percent based on the weight of the styrenic polymer;

(c) mixing intimately the styrenic polymer and the carbon dioxide; and (d) extruding and foaming the mixture at a die temperature able to maintain a foamable mixture of the molten styrenic polymer and the carbon dioxide but below about 150° C. into a region of lower pressure to form thermoplastic foam having cell sizes in all direction which are less than one millimeter and a foam sheet thickness which is less than about 0.5 inch.

2. The process for producing a thermoplastic foam, as recited in claim 1, wherein the carbon dioxide is introduced into the polymer melt as a liquid.

3. The process for producing a thermoplastic foam, as recited in claim 2, wherein the carbon dioxide is continuously and directly introduced into the polymer melt as a liquid in an amount of about 0.5 to about 6 weight percent by weight of the polymer.

4. The process for producing a thermoplastic foam, as recited in claim 1, including the step of thermoforming the thermoplastic foam into articles.

5. The process for producing a thermoplastic foam, as recited in claim 1, including the step of passing the thermoplastic foam over a forming mandrel having a blow up ratio of greater than about 2.0:1 immediately after step (d).

6. The process for producing a thermoplastic foam, as recited in claim 1, including the step of aging the thermoplastic foam, after step (d) and prior to thermoforming, until the thermoplastic foam has substantially constant tensile elongation values over an extended period of time under ambient conditions in both a machine and a cross direction after an initial aging period and the tensile elongation values are greater than or equal to about five percent over an extended period of time under ambient conditions in both a machine and a cross direction.

7. The process for producing a thermoplastic foam, as recited in claim 1, wherein the styrenic polymer is polystyrene.

8. The process for producing a thermoplastic foam, as recited in claim 1, wherein the die temperature in step (d) is between about 130° C. to about 145° C.

* * * * *